(12) United States Patent
Chae et al.

(10) Patent No.: US 7,463,693 B2
(45) Date of Patent: Dec. 9, 2008

(54) APPARATUS AND METHOD FOR FULL-DIVERSITY, FULL-RATE SPACE-TIME BLOCK CODING FOR TWO TRANSMIT ANTENNAS

(75) Inventors: Chan-Byoung Chae, Seoul (KR); Won-Il Roh, Yongin-si (KR); Sung-Ryul Yun, Suwon-si (KR); Hong-Sil Jeong, Seoul (KR); Jae-Hak Chung, Seoul (KR); Young-Soo Park, Yongin-si (KR); Kyun-Byoung Ko, Hwasung-si (KR); Seung-Hoon Nam, Seoul (KR); Young-Ho Jung, Seoul (KR); Chan-Soo Hwang, Yongin-si (KR); Jeong-Tae Oh, Yongin-si (KR); Dong-Seek Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 651 days.

(21) Appl. No.: 11/213,380

(22) Filed: Aug. 26, 2005

(65) Prior Publication Data

US 2006/0045201 A1    Mar. 2, 2006

(30) Foreign Application Priority Data

Aug. 27, 2004    (KR) .................. 10-2004-0068149

(51) Int. Cl.
*H04B 7/02* (2006.01)
*H04L 27/20* (2006.01)

(52) U.S. Cl. .................. 375/267; 375/299; 375/302

(58) Field of Classification Search ............... 375/260, 375/267, 295, 299, 302, 308
See application file for complete search history.

(56) References Cited

U.S. PATENT DOCUMENTS

| | | | |
|---|---|---|---|
| 6,452,916 B1 | 9/2002 | Hochwald et al. | |
| 2003/0073464 A1 | 4/2003 | Giannakis et al. | |
| 2003/0227979 A1* | 12/2003 | Tirkkonen | 375/267 |
| 2004/0072594 A1 | 4/2004 | Hwang et al. | |
| 2004/0132413 A1* | 7/2004 | Hwang et al. | 455/73 |
| 2005/0105629 A1* | 5/2005 | Hottinen et al. | 375/261 |

FOREIGN PATENT DOCUMENTS

| | | |
|---|---|---|
| WO | WO 99/14871 | 3/1999 |
| WO | WO 02/052773 | 7/2002 |
| WO | WO 03/101029 | 12/2003 |

OTHER PUBLICATIONS

Vahid Tarokh et al., Space-Time Block Codes from Orthogonal Designs, IEEE Transactions on Information Theory, vol. 45, No. 5, Jul. 1999, pp. 1456-1467.
Siavash M. Alamouti; A Simple Transmit Diversity Technique for Wireless Communications, IEEE Journal on Select Areas in Communications, vol. 16, No. 8, Oct. 1998, pp. 1451-1458.

* cited by examiner

*Primary Examiner*—David B Lugo
(74) *Attorney, Agent, or Firm*—The Farrell Law Firm, PC

(57) ABSTRACT

An apparatus and method for full-diversity, full-rate space-time block coding in a transmitter using two Tx antennas are provided. An input symbol sequence is STBC-encoded in a predetermined method and transmitted through the two Tx antennas.

17 Claims, 6 Drawing Sheets

$$C = \begin{bmatrix} as_1 + jbs_4 & bs_2 + as_3 \\ as_2 - bs_3 & jbs_1 + as_4 \end{bmatrix} = \begin{bmatrix} c_1 & c_3 \\ c_2 & c_4 \end{bmatrix}$$

$$C = \begin{bmatrix} as_1 + jbs_4 & bs_2 + as_3 \\ as_2 - bs_3 & jbs_1 + as_4 \end{bmatrix} = \begin{bmatrix} c_1 & c_3 \\ c_2 & c_4 \end{bmatrix}$$

US 7,463,693 B2

APPARATUS AND METHOD FOR FULL-DIVERSITY, FULL-RATE SPACE-TIME BLOCK CODING FOR TWO TRANSMIT ANTENNAS

PRIORITY

This application claims priority under 35 U.S.C. § 119 to an application entitled "Apparatus And Method For Full-Diversity, Full-Rate Space-Time Block Coding For Two Transmit Antennas" filed in the Korean Intellectual Property Office on Aug. 27, 2004 and assigned Serial No. 2004-68149, the contents of which are incorporated herein by reference.

BACKGROUND OF THE INVENTION

1. Field of the Invention

The present invention relates generally to a space-time block coding (STBC) apparatus and method for a transmitter in a wireless communication system, and in particular, to an STBC apparatus and method for maximizing coding advantage (or coding gain) and achieving full diversity and full rate in a mobile communication system using two transmit (Tx) antennas.

2. Description of the Related Art

The basic issue in wireless communications is how efficiently and reliably to transmit data on channels. Along with the demand for a high-speed communication system capable of processing and transmitting video and wireless data in addition to the traditional voice service, future-generation multimedia mobile communication systems, now under active study, increase system efficiency using an appropriate channel coding scheme.

Generally, in the wireless channel environment of a mobile communication system, unlike that of a wired channel environment, a transmission signal inevitably experiences loss due to several factors such as multipath interference, shadowing, wave attenuation, time-variant noise, and fading.

The information loss causes a severe distortion in the actual transmission signal, degrading the whole system performance. In order to reduce the information loss, many error control techniques are adopted, depending on the characteristics of channels, to increase system reliability. The basic error control technique is to use an error correction code.

Multipath fading is relieved by diversity techniques in the wireless communication system. The diversity techniques are classified as time diversity, frequency diversity, and antenna diversity.

The antenna diversity technique uses multiple antennas. This diversity scheme is further branched into receive (Rx) antenna diversity using a plurality f Rx antennas, Tx antenna diversity using a plurality of Tx antennas, and multiple-input multiple-output (MIMO) using a plurality of Tx antennas and a plurality of Rx antennas.

The MIMO is a special case of space-time block coding (STC) that extends coding in the time domain to the space domain by transmission of a signal encoded in a predetermined coding method through a plurality of Tx antennas, with the aim to achieve a lower error rate.

V. Tarokh, et al. proposed STBC as one of methods of efficiently achieving antenna diversity (see "Space-Time Block Coding from Orthogonal Designs", IEEE Trans. On Info., Theory, Vol. 45, pp. 1456-1467, July 1999). The Tarokh STBC scheme is an extension of the Tx antenna diversity scheme of S. M. Alamouti (see, "A Simple Transmit Diversity Technique for Wireless Communications", IEEE Journal on Selected Area in Communications, Vol. 16, pp.1451-1458, October 1988), for two or more Tx antennas. In addition, the use of spatial multiplexing (SM) aiming to increase data rate leads to capacity that is linearly proportional to the number of Tx antennas.

FIG. 1 is a block diagram of a transmitter in a mobile communication system using the conventional STBC scheme proposed by Tarokh. The transmitter is comprised of a modulator 100, a serial-to-parallel (S/P) converter 102, an STBC coder 104, and four Tx antennas 106, 108, 110 and 112.

Referring to FIG. 1, the modulator 100 modulates input information data (or coded data) in a predetermined modulation scheme. The modulation scheme can be one of binary phase shift keying (BPSK), quadrature phase shift keying (QPSK), quadrature amplitude modulation (QAM), pulse amplitude modulation (PAM), and phase shift keying (PSK).

The S/P converter 102 parallelizes serial modulation symbols, $s_1, s_2, s_3, s_4$ received from the modulator 100. The STBC coder 104 creates eight symbol combinations by STBC-encoding the four modulation symbols, $s_1, s_2, s_3, s_4$ and sequentially transmits them through the four Tx antennas 106 to 112. A coding matrix used to generate the eight symbol combinations is expressed by Equation 1:

$$G_4 = \begin{bmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \\ s_1^* & s_2^* & s_3^* & s_4^* \\ -s_2^* & s_1^* & -s_4^* & s_3^* \\ -s_3^* & s_4^* & s_1^* & -s_2^* \\ -s_4^* & -s_3^* & s_2^* & s_1^* \end{bmatrix}$$

where $G_4$ denotes the coding matrix for symbols transmitted through the four Tx antennas 106 to 112 and $s_1, s_2, s_3, s_4$ denote the input four symbols to be transmitted. The number of the columns of the coding matrix is equal to that of the Tx antennas and the number of the rows corresponds to the time required to transmit the four symbols. Thus, the four symbols are transmitted through the four Tx antennas for eight time intervals.

Specifically, for a first time interval, $s_1$ is transmitted through the first Tx antenna 106, $s_2$ through the second Tx antenna 108, $s_3$ through the third Tx antenna 110, and $s_4$ through the fourth Tx antenna 112. In this manner, $-s_4^*, -s_3^*, s_2^*, -s_1^*$ are transmitted through the first to fourth Tx antennas 106 to 112, respectively for an eighth time interval. That is, the STBC coder 104 sequentially provides the symbols of an $i^{th}$ column in the coding matrix to an $i^{th}$ Tx antenna.

As described above, the STBC coder 104 generates the eight symbol sequences using the input four symbols and their conjugates and negatives and transmits them through the four Tx antennas 106 to 112 for eight time intervals. Since the symbol sequences output to the respective Tx antennas, that is, the columns of the coding matrix are mutually orthogonal, as high a diversity gain as a diversity order is achieved.

FIG. 2 is a block diagram of a receiver in the mobile communication system using the conventional STBC scheme. The receiver is the counterpart of the transmitter illustrated in FIG. 1.

The receiver is comprised of a plurality of Rx antennas 200 to 202, a channel estimator 204, a signal combiner 206, a detector 208, a parallel-to-serial (P/S) converter 210, and a demodulator 212. The first to $P^{th}$ Rx antennas 200 to 202 provide signals received from the four Tx antennas of the transmitter illustrated in FIG. 1 to the channel estimator 204 and the signal combiner 206. The channel estimator 204 estimates channel coefficients representing channel gains from the Tx antennas 106 to 112 to the Rx antennas 200 to 202 using the signals received from the first to $P^{th}$ Rx antennas 200 to 202. The signal combiner 206 combines the signals received from the first to $P^{th}$ Rx antennas 200 to 202 with the channel coefficients estimated by the channel estimator 209 in a predetermined method. The detector 208 generates hypothesis symbols by multiplying the combined symbols by the channel coefficients, calculates decision statistics for all possible transmitted symbols from the transmitter using the hypothesis symbols, and detects the actual transmitted symbols through threshold detection. The P/S converter 210 serializes the parallel symbols received from the detector 208. The demodulator 212 demodulates the serial symbol sequence in a predetermined demodulation method, thereby recovering the original information bits.

As stated earlier, the Alamouti STBC technique offers the benefit of achieving as high a diversity order as the number of Tx antennas, namely a full diversity order, without sacrificing the data rate by transmitting complex symbols through two Tx antennas only.

The Tarokh STBC scheme, which is an extension of the Alamouti STBC scheme, achieves a full diversity order using a space-time block code in the form of a matrix with orthogonal columns, as described with reference to FIGS. 1 and 2. However, because four complex symbols are transmitted for eight time intervals, the Tarokh STBC scheme brings a decrease by half in the data rate. In addition, since it takes eight time intervals to completely transmit one block with four complex symbols, reception performance is degraded due to channel changes within the block over a fast fading channel. In other words, the transmission of complex symbols through four or more Tx antennas requires 2N time intervals for N symbols, causing a longer latency and a decrease in the data rate.

FIG. 3 is a block diagram of a conventional SM transmitter for 5 increasing data rate. Referring to FIG. 3, an S/P converter 303 vertically distributes signals modulated in a modulator 301 to Tx antennas 305, for transmission. The use of the thus-configured transmitter requires a number of (Rx) antennas equal to or greater than the number of the Tx antennas 305. While four Tx antennas are used in the illustrated case, the SM technique is applicable to any number of Tx antennas. In particular, Diagonal Bell Labs Layered Space Time (D-BLAST) and Vertical-BLAST (V-BLSAT) processing techniques are available according to S/P conversion and receiver configuration. These space-time processing techniques are applications of successive interference cancellation (SIC) to receivers. They are suboptimal solutions.

As is clear from the above description of the conventional techniques, an STBC apparatus and method have yet to be developed which achieve full diversity and full rate simultaneously for two Tx antennas. In a mobile communication system with two Tx antennas, the full diversity is [2×number of Rx antennas] (2 is the number of Tx antennas) and the full rate is 2. The use of two Tx antennas increases the data rate and the increase is double that available in a single-input single-output (SISO) system.

Accordingly, a need exists for developing a full-diversity, full-rate STBC apparatus and method in a mobile communication system using two Tx antennas.

Another need exists for developing an STBC apparatus and method that maximize coding gain in a mobile communication system using two Tx antennas.

SUMMARY OF THE INVENTION

An object of the present invention is to substantially solve at least the above problems and/or disadvantages and to provide at least the advantages that are described below. Accordingly, an object of the present invention is to provide a full-diversity, full-rate space-time block code in a mobile communication system using two Tx antennas.

Another object of the present invention is to provide a full-diversity, full-rate STBC apparatus and method in a mobile communication system using two Tx antennas.

A further object of the present invention is to provide a full-diversity, full-rate space-time STBC apparatus and method for creating a space-time block code with a phase value θ that maximizes coding gain in a mobile communication system using two Tx antennas.

The above objects are achieved by providing an apparatus and method for full-diversity, full-rate space-time block coding in a transmitter using two Tx antennas.

According to one aspect of the present invention, in a transmitter, a space-time block coder space-time encodes input information symbols by $$C = \begin{bmatrix} a \times s_1 + j \times b \times s_4 & b \times s_2 + a \times s_3 \\ a \times s_2 - b \times s_3 & j \times b \times s_1 + a \times s_4 \end{bmatrix}$$

where C is a coding matrix, $s_1, s_2, s_3, s_4$ are the input information symbols, and a and b are constants in the relationship that $a^2+b^2=\frac{1}{2}$. Two antennas transmit the space-time coded symbols.

According to another aspect of the present invention, in a transmitting method in a transmitter having two transmit antennas, input information symbols are space-time encoded using $$C = \begin{bmatrix} a \times s_1 + j \times b \times s_4 & b \times s_2 + a \times s_3 \\ a \times s_2 - b \times s_3 & j \times b \times s_1 + a \times s_4 \end{bmatrix}$$

where C is a coding matrix, $s_1, s_2, s_3, s_4$ are the input information symbols, and a and b are constants in the relationship that $a^2+b^2=\frac{1}{2}$. The space-time coded symbols are transmitted through the two transmit antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides an STBC apparatus and method for a transmitter using two Tx antennas in a communication system, in which input information symbols are STBC-encoded in a predetermined method and transmitted through the two corresponding Tx antennas, to thereby achieve full diversity and full rate.

The present invention also provides an STBC apparatus and method for a transmitter using two Tx antennas in a communication system, in which input information symbols are STBC-encoded in a predetermined method and transmitted through the two corresponding Tx antennas, to thereby maximize coding gain.

Figure 1:
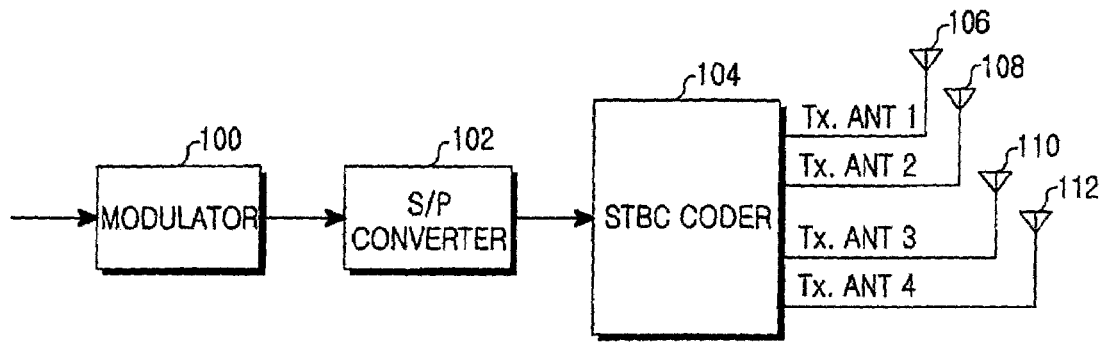
FIG. 1 is a block diagram of a conventional STBC transmitter in a mobile communication system.
Figure 2:
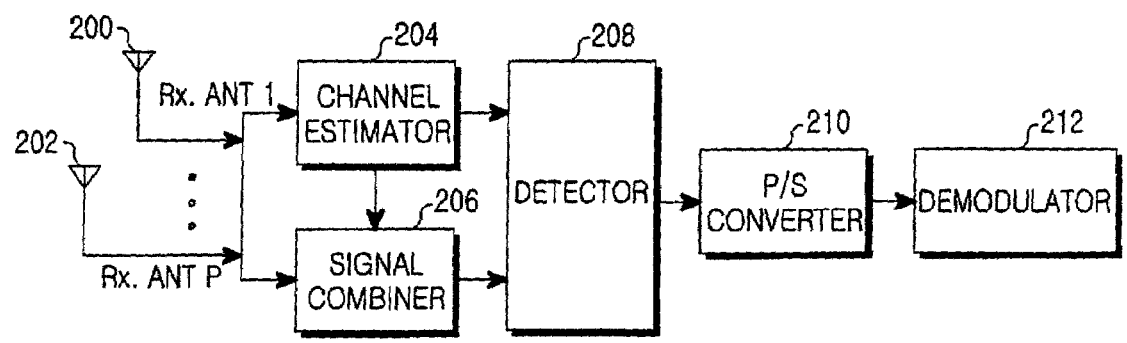
FIG. 2 is a block diagram of a conventional STBC receiver in a mobile communication system.
Figure 3:
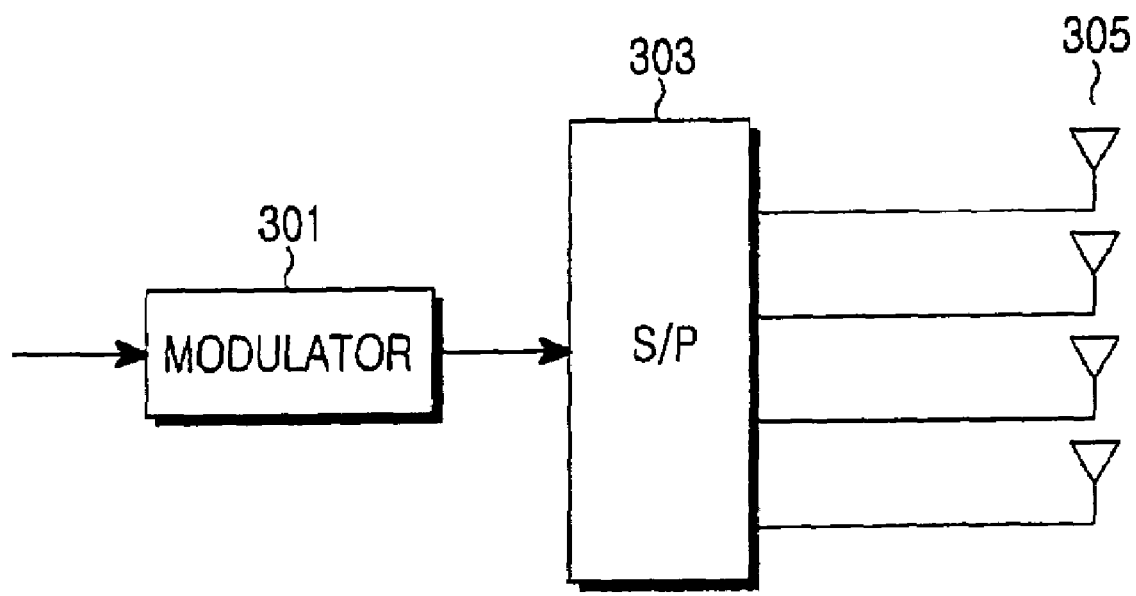
FIG. 3 is a block diagram of a conventional SM transmitter in a mobile communication system.
Figure 4:
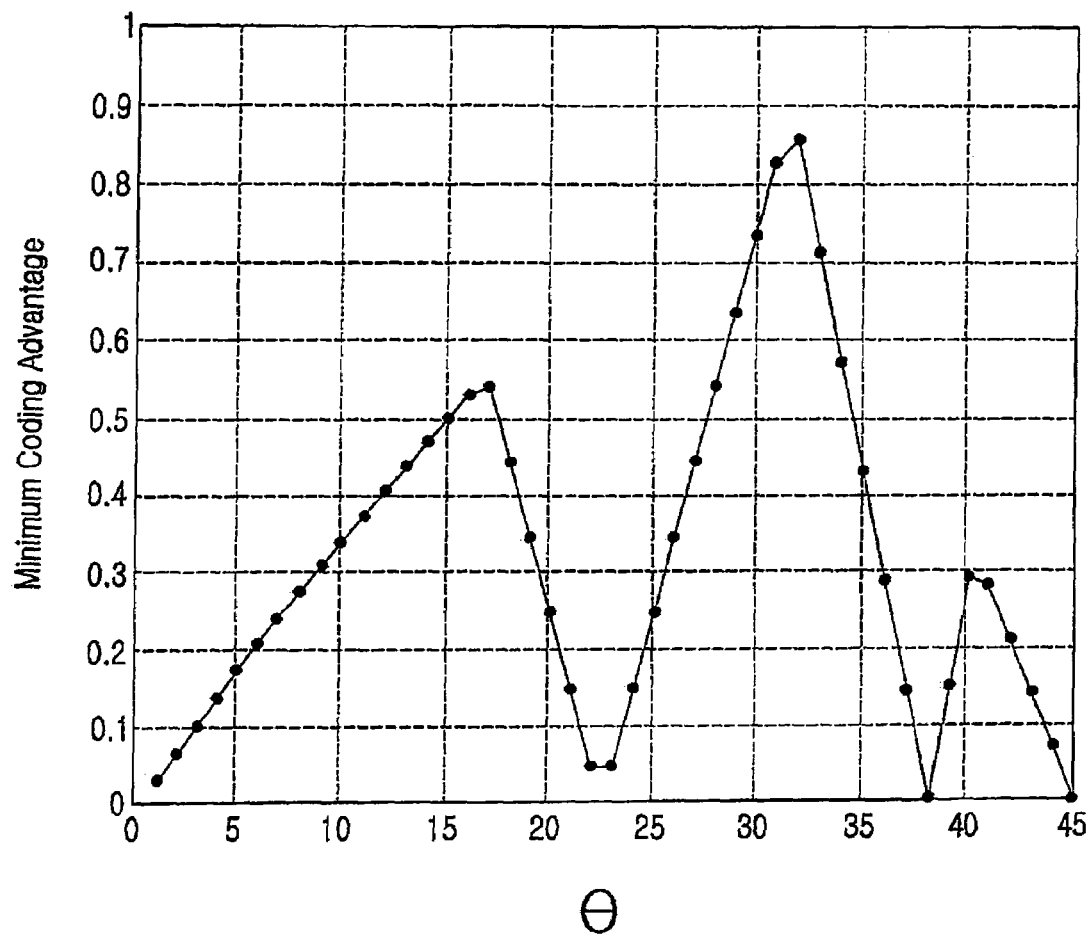
FIG. 4 is a graph illustrating conventional minimum coding advantage (gains) as a function of phase angle θ in designing a space-time block code.
Figure 5:
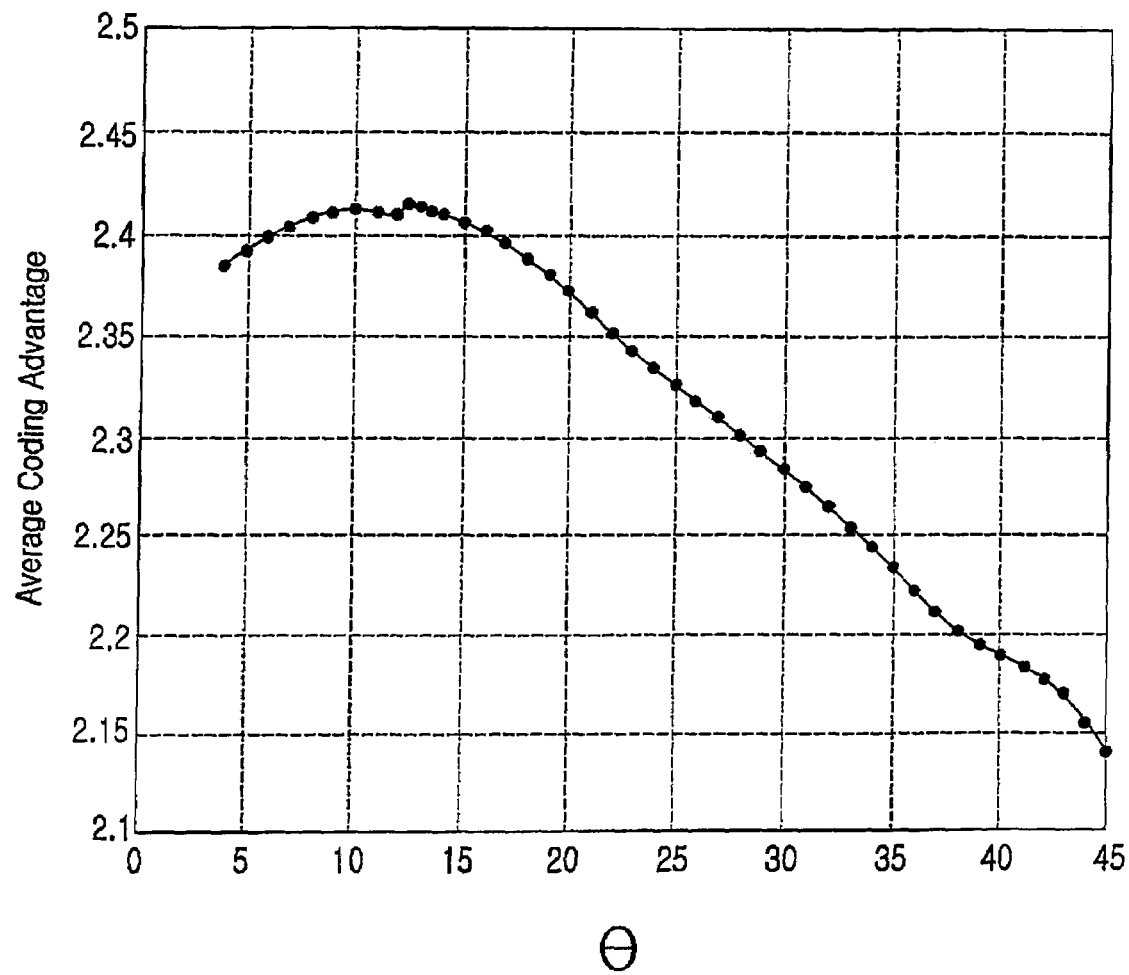
FIG. 5 is a graph illustrating average coding advantage (gains) as a function of phase angle θ in designing an STBC according to the present invention.

FIG. 4 is a graph illustrating conventional minimum coding gains as a function of phase angle θ in designing a space-time block code. FIG. 5 is a graph illustrating average coding gains as a function of phase angle θ in designing an STBC according to the present invention. Before describing the graphs of FIGS. 4 and 5, the configuration of an STBC apparatus according to the present invention will first be described below with reference to FIG. 6, which is a block diagram of a transmitter in a mobile communication system using a full-diversity, full-rate STBC scheme.

Figure 6:
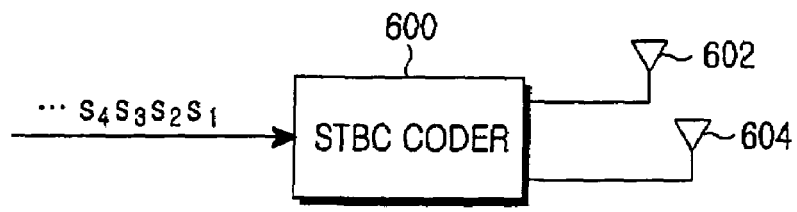
FIG. 6 is a block diagram of a transmitter in a mobile communication system using a full diversity, full rate STBC scheme according to the present invention.

Referring to FIG. 6, an STBC coder 600 STBC-encodes modulated information symbols $s_1, s_2, s_3, s_4$ received from a modulator, prior to transmission through two Tx antennas 602 and 604. A coding matrix used for the STBC coding is set forth in Equation 2:

$$C = \begin{bmatrix} a \times s_1 + j \times b \times s_4 & b \times s_2 + a \times s_3 \\ a \times s_2 - b \times s_3 & j \times b \times s_1 + a \times s_4 \end{bmatrix} \quad (2)$$

where $s_1, s_2, s_3, s_4$ are information symbols after modulation. The information symbols refer to symbols created by modulating information data in the modulator. These information symbols are STBC-encoded using the above coding matrix and then transmitted through the two Tx antennas.

In Equation 2, parameters a and b used for designing a new space-time block code are defined in Equation 3.

$$a = \text{Re}\left(\frac{1}{\sqrt{2}} e^{j\theta}\right) \quad (3)$$
$$b = \text{Im}\left(\frac{1}{\sqrt{2}} e^{j\theta}\right)$$

where a is the real value of the operation in the parenthesis of the upper equation and b is the imaginary value of the operation in the parenthesis of the lower equation. As is noted, a and b are related such that $a^2 + b^2 = \frac{1}{2}$. θ is a parameter representing a phase angle on a complex plane, used to increase the coding gain of the space-time block code. Multiplication by $e^{j\theta}$ amounts to rotation by θ on the complex plane.

In the above STBC coding matrix C of Equation 2, the rows represent Tx antennas and the columns represent time intervals. To be more specific, $a \times s_1 + j \times b \times s_4$ is transmitted through the first Tx antenna in the first time interval. In this way, the four elements of the matrix C are all transmitted through the two Tx antennas for two time intervals. During this operation, the information symbols $s_1, s_2, s_3, s_4$ are transmitted because the matrix elements contain $s_1, s_2, s_3, s_4$. Transmission of four information symbols for two time intervals leads to a data rate of 2.

Also, every symbol experiences all channels generated from the two Tx antennas, thus resulting in full diversity. This is possible because the matrix elements have real and imaginary values.

A description below will be made of how the parameter θ, involved in producing the parameters a and b, can be obtained so as to maximize the coding gain.

In 1977, Tarokh proposed two design rules for a space-time trellis code in his thesis. The pairwise error probability (PEP) bound for the space-time trellis code is defined as Equation 4:

$$p(c \to e) \leq \left(\prod_{n=1}^{r} \lambda_n\right)^{-M} \left(\frac{E_s}{4N_o}\right)^{-rM} \quad (4)$$

where r is the rank of the c→e matrix, M is the number of Rx antennas, λ is a c-e diagonal term, $E_s$ is symbol energy, and $N_o$ is noise. The left and right terms on the right side of Equation 4 respectively describe a determinant criterion representing coding gain and a rank criterion representing diversity gain, as defined below:

1) Determinant Criterion: The determinant criterion maximizes the coding gain. For high coding gain, one should maximize the product of $\lambda_1 \ldots \lambda_r$.

2) Rank Criterion: The rank criterion maximizes the diversity gain. It ensures that the space-time block code gives the full rank.

For the current space-time block codes, Tarokh's determinant criterion was employed in most cases so far. The minimum of the products of non-zero eigenvalues of an N×N matrix A(c, e) for the difference (c-e) between two different signal vectors c and e should be maximized according to this criterion. While it does not require a large computation volume, it was found that Tarokh's determinant criterion is not effective in detecting a value maximizing the coding gain with accuracy.

Referring now to FIG. 4, a graph illustrating conventional minimum coding gains as a function of phase angle θ in designing a space-time block code is shown. The graph shows minimum coding advantage (gains) over θ from 0° to 45° according to the Tarokh determinant criterion. The minimum coding gains are symmetrical with respect to 45° when θ is in the range of 45° to 90° and the same minimum coding gain is obtained when θ is 90° or above. That is, a first value in the range 0°≦θ<45°, a second value being θ+45°, and the sums of the first value and 90n and the second value and 90n (n is an integer) lead to the same minimum coding gain. As noted from FIG. 4, the maximum minimum coding gain is achieved for a phase of about 32°. However, a simulation with the phase angle set to about 32° demonstrated that the performance is degraded rather than improved.

To combat the problem and accurately detect an optimum value of the phase θ, the mean coding gain is used in Equation 5:

$$\underset{\theta}{\operatorname{argmax}} \operatorname{mean}(C.A.) \quad (5)$$

where C.A. represents coding advantage (i.e. coding gain). Using Equation 5, one can compute a mean coding gain using all possible coding gains and their numbers of cases and find the value of the phase angle θ that maximizes the mean coding gain. It was verified that this optimum phase angle θ enhances the coding gain.

FIG. 5 is a graph illustrating average coding gains over various values of the phase angle θ in designing an STBC according to the present invention. As observed from FIG. 5, the highest average coding gain is achieved at 12.2°.

In actual implementation, the following phase ranges are available.

According to Equation 5, 12°≦θ≦13° or 77°≦θ≦78° are available when 0°≦θ≦90°, and 12+90n≦θ≦13°+90n or 77°+90n≦θ≦78°+90n wherein 90°<θ. Here, n is an integer.

Figure 7:
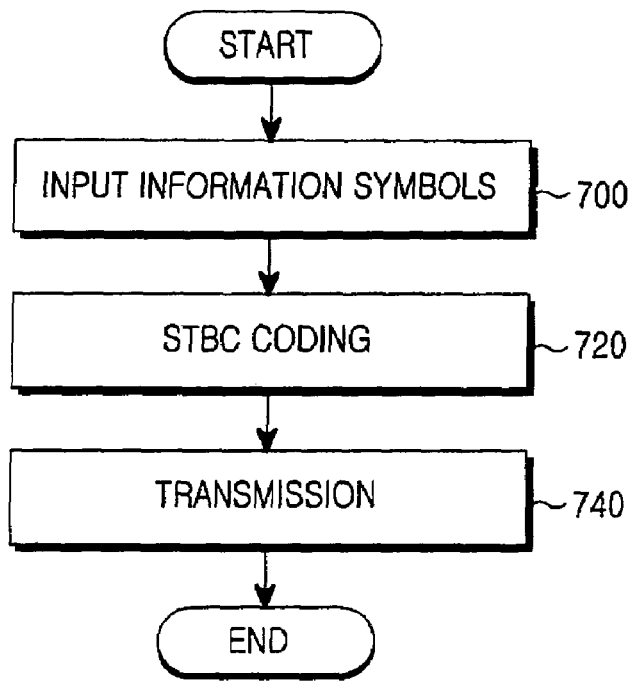
FIG. 7 is a block diagram of a transmission operation in the mobile communication system using the full diversity, full rate STBC scheme according to the present invention.

FIG. 7 is a block diagram of a transmission operation in the mobile communication system using the full diversity, full rate STBC scheme according to the present invention. Referring to FIG. 7, the STBC coder 600 receive the information symbols $s_1$, $s_2$, $s_3$, $s_4$ from the modulator in step 700 and STBC-encodes the information symbols using Equation 2 and Equation 3 in step 720. In step 740, the coded symbols are transmitted through the two antennas 602 and 604 for two time intervals.

In the transmission operation, θ is used such that 26°≦θ≦27° or 61°≦θ≦62° in the range of 0°≦θ<90°, and 26°+90n≦θ≦27°+90n or 61°+90n≦θ≦62°+90n (n is an integer) in the range of 90°<θ.

Figure 8:
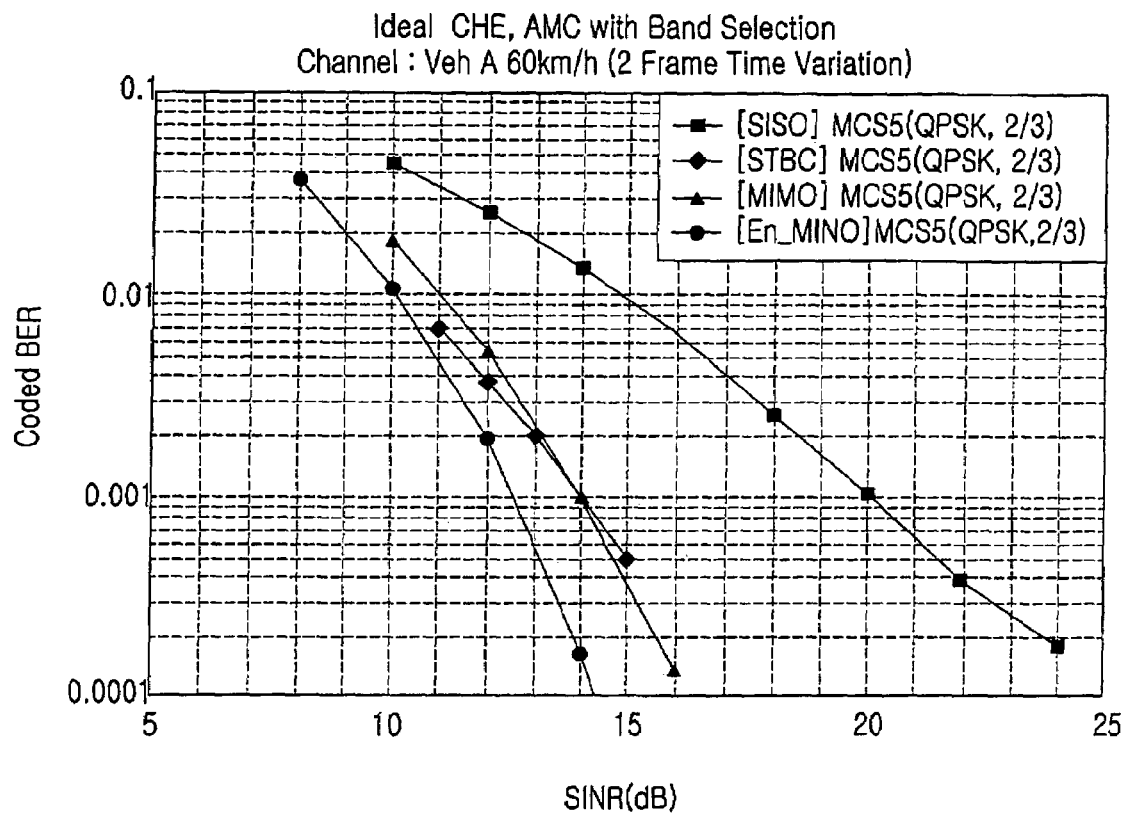
FIG. 8 is a graph illustrating the bit error rate (BER) performance of the present invention.

FIG. 8 is a graph illustrating the bit error rate (BER) performance of the present invention. MIMO QPSK ⅔ represents the performance curve of a conventional SM and En_MIMO represents the performance curve of the present invention. The performance curve of the present invention reveals that there is a gain of about 1.5 dB for a coded BER of 0.001.

In accordance with the present invention as described above, an STBC coder STBC-encodes input information symbols using Equation 3 and transmits the coded symbols through two Tx antennas, thereby enabling mobile communications with full diversity and full rate.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmitter comprising:
    a space-time block coder for space-time encoding input information symbols by:

$$C = \begin{bmatrix} a \times s_1 + j \times b \times s_4 & b \times s_2 + a \times s_3 \\ a \times s_2 - b \times s_3 & j \times b \times s_1 + a \times s_4 \end{bmatrix}$$

where C is a coding matrix, $s_1$, $s_2$, $s_3$, $s_4$ are the input information symbols, and a and b are constants in the relationship $a^2+b^2=\frac{1}{2}$, and for outputting space-time coded symbols; and two antennas for transmitting the space-time coded symbols.

2. The transmitter of claim 1, wherein a and b are defined by:

$$a = \operatorname{Re}\left(\frac{1}{\sqrt{2}} e^{j\theta}\right)$$

$$b = \operatorname{Im}\left(\frac{1}{\sqrt{2}} e^{j\theta}\right)$$

where θ is a phase angle.

3. The transmitter of claim 2, wherein the phase angle θ is calculated by:

$$\underset{\theta}{\operatorname{argmax}} \operatorname{mean}(C.A.)$$

(where C.A. represents coding advantage (i.e. coding gain).

4. The transmitter of claim 2, wherein the phase angle θ satisfies:
    12°≦θ≦13° or 77°≦θ≦78° in the range of 0°≦θ≦90°.

5. A transmitter comprising:
    a space-time block coder for space-time encoding input information symbols by:

$$C = \begin{bmatrix} a \times s_1 + j \times b \times s_4 & b \times s_2 + a \times s_3 \\ a \times s_2 - b \times s_3 & j \times b \times s_1 + a \times s_4 \end{bmatrix}$$

where C is a coding matrix, $s_1$, $s_2$, $s_3$, $s_4$ are the input information symbols, and a and b are defined as $$a = \operatorname{Re}\left(\frac{1}{\sqrt{2}} e^{j\theta}\right)$$

$$b = \operatorname{Im}\left(\frac{1}{\sqrt{2}} e^{j\theta}\right)$$

where θ represents a phase angle satisfying the range: 12°+90n≦θ≦13°+90n or 77°+90n≦θ≦78°+90n (n is a positive integer) in the range of 90°<θ, and for outputting space-time coded symbols; and two antennas for transmitting the space-time coded symbols.

6. A space-time block coder transmitting method in a transmitter including and having two transmit antennas, the method comprising: space-time encoding input information symbols by:

$$C = \begin{bmatrix} a \times s_1 + j \times b \times s_4 & b \times s_2 + a \times s_3 \\ a \times s_2 - b \times s_3 & j \times b \times s_1 + a \times s_4 \end{bmatrix}$$

where C is a coding matrix, $s_1$, $s_2$, $s_3$, $s_4$ are the input information symbols, and a and b are constants in the relationship $a^2+b^2=\frac{1}{2}$, and transmitting space-time coded symbols through the two transmit antennas.

7. The method of claim 6, wherein a and b are defined by:

$$a = \mathrm{Re}\left(\frac{1}{\sqrt{2}}e^{j\theta}\right)$$

$$b = \mathrm{Im}\left(\frac{1}{\sqrt{2}}e^{j\theta}\right)$$

where θ is a phase.

8. The space-time block coder of claim 7, wherein the phase angle θ is calculated by:

$$\arg\max_{\theta}\ \mathrm{mean}(C.A.)$$

where C.A. represents coding advantage (i.e. coding gain).

9. The space-time block coder of claim 7, wherein the phase θ satisfies: 12°≦θ≦13° or 77°≦θ≦78° in the range of 0°≦θ≦90°, and 12°+90n≦θ≦13°+90n or 77°+90n≦θ≦78°+90n (n is a positive integer) in the range of 90°<θ.

10. A transmitting method in a transmitter having two transmit antennas, comprising the steps of:
space-time block coding input information symbols by:

$$C = \begin{bmatrix} a \times s_1 + j \times b \times s_4 & b \times s_2 + a \times s_3 \\ a \times s_2 - b \times s_3 & j \times b \times s_1 + a \times s_4 \end{bmatrix}$$

where C is a coding matrix, $s_1$, $s_2$, $s_3$, $s_4$ are the input information symbols, and a and b are constants in the relationship $a^2+b^2=\frac{1}{2}$, and outputting space-time coded symbols; and
transmitting the space-time coded symbols through the two transmit antennas.

11. The transmitting method of claim 10, wherein a and b are defined by:

$$a = \mathrm{Re}\left(\frac{1}{\sqrt{2}}e^{j\theta}\right)$$

$$b = \mathrm{Im}\left(\frac{1}{\sqrt{2}}e^{j\theta}\right)$$

where θ is a phase angle.

12. The transmitting method of claim 11, wherein the phase angle θ satisfies: 12°≦θ≦13° or 77°≦θ≦78° in the range of 0°≦θ≦90°.

13. A transmitting method in a space-time block coding transmitter having two transmit antennas, comprising the steps of:
space-time encoding input information symbols by:

$$C = \begin{bmatrix} a \times s_1 + j \times b \times s_4 & b \times s_2 + a \times s_3 \\ a \times s_2 - b \times s_3 & j \times b \times s_1 + a \times s_4 \end{bmatrix}$$

where C is a coding matrix, $s_1$, $s_2$, $s_3$, $s_4$ are the input information symbols, and a and b are defined as:

$$C = \begin{bmatrix} a \times s_1 + j \times b \times s_4 & b \times s_2 + a \times s_3 \\ a \times s_2 - b \times s_3 & j \times b \times s_1 + a \times s_4 \end{bmatrix}$$

where θ representing a phase angle satisfies: 12°+90n≦θ≦13°+90n or 77°+90n≦θ≦78°+90n (n is a positive integer) in the range of 90°<θ); and
transmitting space-time coded symbols through the two transmit antennas.

14. A space-time block coding method in a transmitter having two transmit antennas, comprising the steps of:
space-time encoding input information symbols by:

$$C = \begin{bmatrix} a \times s_1 + j \times b \times s_4 & b \times s_2 + a \times s_3 \\ a \times s_2 - b \times s_3 & j \times b \times s_1 + a \times s_4 \end{bmatrix}$$

where C is a coding matrix, $s_1$, $s_2$, $s_3$, $s_4$ are the input information symbols, and a and b are constants in the relationship $a^2+b^2=\frac{1}{2}$; and
outputting space-time coded symbols.

15. The space-time block coding method of claim 14, wherein a and b are defined by:

$$a = \mathrm{Re}\left(\frac{1}{\sqrt{2}}e^{j\theta}\right)$$

$$b = \mathrm{Im}\left(\frac{1}{\sqrt{2}}e^{j\theta}\right)$$

where θ is a phase angle.

16. The space-time block coding method of claim 15, wherein the phase angle θ is calculated by:

$$\arg\max_{\theta}\ \mathrm{mean}(C.A.)$$

where C.A. represents coding advantage (i.e. coding gain).

17. The space-time block coding method of claim 15, wherein the phase angle θ satisfies: 12°≦θ≦13° or 77°≦θ≦78° in the range of 0°≦θ≦90°, and 12°+90n≦θ≦13°+90n or 77°+90n≦θ≦78°+90n (n is a positive integer) in the range of 90°<θ.

* * * * *